United States Patent [19]

Suzuki

[11] 4,343,033
[45] Aug. 3, 1982

[54] MARKER LIGHT

[75] Inventor: Kiyoshi Suzuki, Yokohama, Japan

[73] Assignee: Toshiba Electric Equipment Corporation, Tokyo, Japan

[21] Appl. No.: 123,694

[22] Filed: Feb. 22, 1980

[51] Int. Cl.³ ............... F21V 7/12; F21V 19/02
[52] U.S. Cl. .................... 362/307; 362/145;
362/153; 362/310; 362/311; 362/362; 362/368;
362/372; 362/375; 362/390; 362/267
[58] Field of Search ............... 362/362, 35, 267, 311,
362/372, 307, 310, 153, 145, 368, 375, 390

[56] References Cited
U.S. PATENT DOCUMENTS

| | | | |
|---|---|---|---|
| 2,184,004 | 12/1939 | Pennow | 362/267 |
| 2,359,151 | 9/1944 | Pennow | 362/267 |
| 2,719,214 | 9/1955 | Potter | 362/267 |
| 2,934,633 | 4/1960 | Cumming | 362/267 |
| 3,015,717 | 1/1962 | Angier | 362/267 |
| 3,113,726 | 12/1963 | Pennow et al. | 362/267 |
| 3,463,913 | 8/1969 | Shavalier | 362/372 |
| 3,689,757 | 9/1972 | Vilshammer | 362/372 |

*Primary Examiner*—Irwin Gluck
*Attorney, Agent, or Firm*—Oblon, Fisher, Spivak, McClelland & Maier

[57] ABSTRACT

A light source, reflector and lens are fixed on a base member in the state that their relative position is adjusted to constitute an optical unit. The optical unit is provided within an optical system box having a sealed construction and having a light transmitting window through which a light emitted from the light source is outwardly projected, thereby forming a marker light.

6 Claims, 3 Drawing Figures

MARKER LIGHT

BACKGROUND OF THE INVENTION

This invention relates to a marker light used for airports and general roads.

The marker light which is installed at airports and the like usually has an optical system comprising a light source lamp, a reflector for forwardly reflecting light emitted from the light source lamp and a prism or a lens for controlling light from the reflector through a filter, and these component parts are progressively accommodated in an optical system casing having a sealed structure. In these prior-art marker lights, however, only the light source lamp and reflector are fixed on a base, with the other components made of glass are directly secured to openings or windows formed in the casing made of a casting of iron, aluminum or the like. Therefore, the characteristics of the optical system cannot be grasped before it is completely assembled, and the adjustment requires troublesome steps of disassembling the casing, carrying out adjustment of the individual component parts and confirming the adjustments after the system is reassembled.

SUMMARY OF THE INVENTION

Accordingly, this invention has an object of permitting the adjustment of the optical system to be done before the optical system is assembled in an optical system casing and also permitting accurate adjustment to be made by mounting the individual component parts of the optical system on a base member In an aspect of the present invention there is provided a marker light comprising an optical system box having a sealed construction and a light transmitting window, a base member provided within the optical system box, a light source, a light reflector and a light control member, and fixing means for fixing the light source, light reflector and light control member on the base member in the state that their relative position is adjusted thereby constituting an optical unit whereby the light from the light source is projected from the window to the outside of the optical system box through the light reflector and light control member.

BRIEF DESCRIPTION OF THE DRAWINGS

This invention can be more fully understood from the following detailed description when taken in conjunction with the accompanying drawings, in which.

DETAILED DESCRIPTION OF THE PREFERRED EMBODIMENTS

An embodiment of the invention will now be described with reference to the accompanying drawings.

Figure 1:
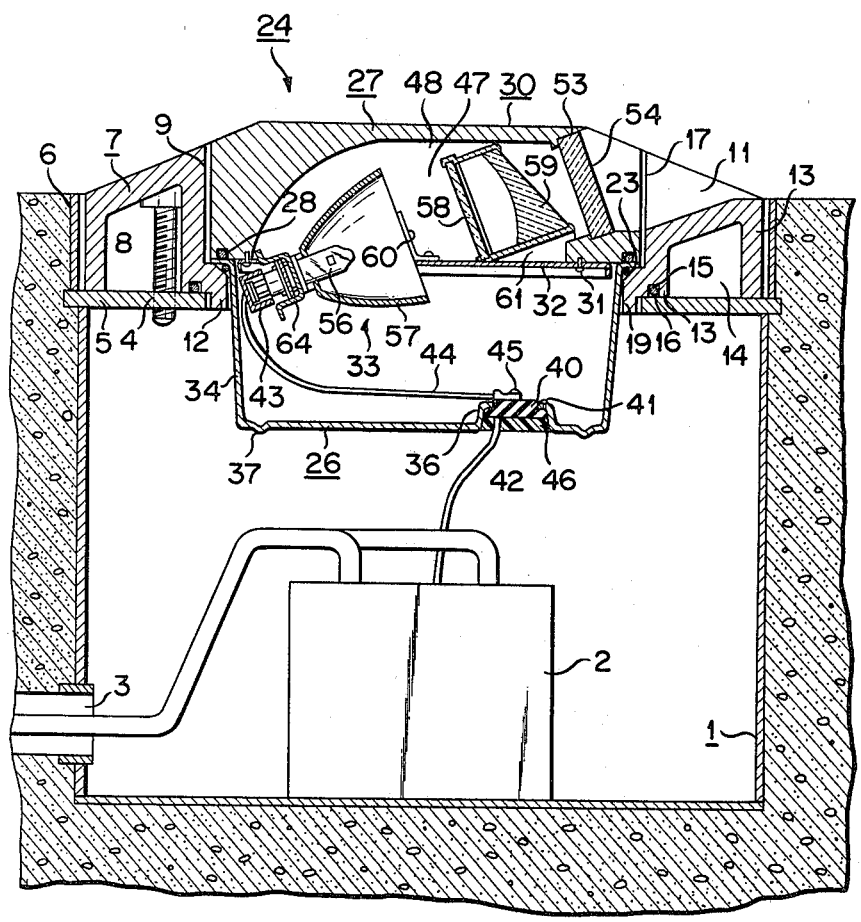
FIG. 1 is a sectional view showing a marker light according to an embodiment of the present invention.
Figure 2:
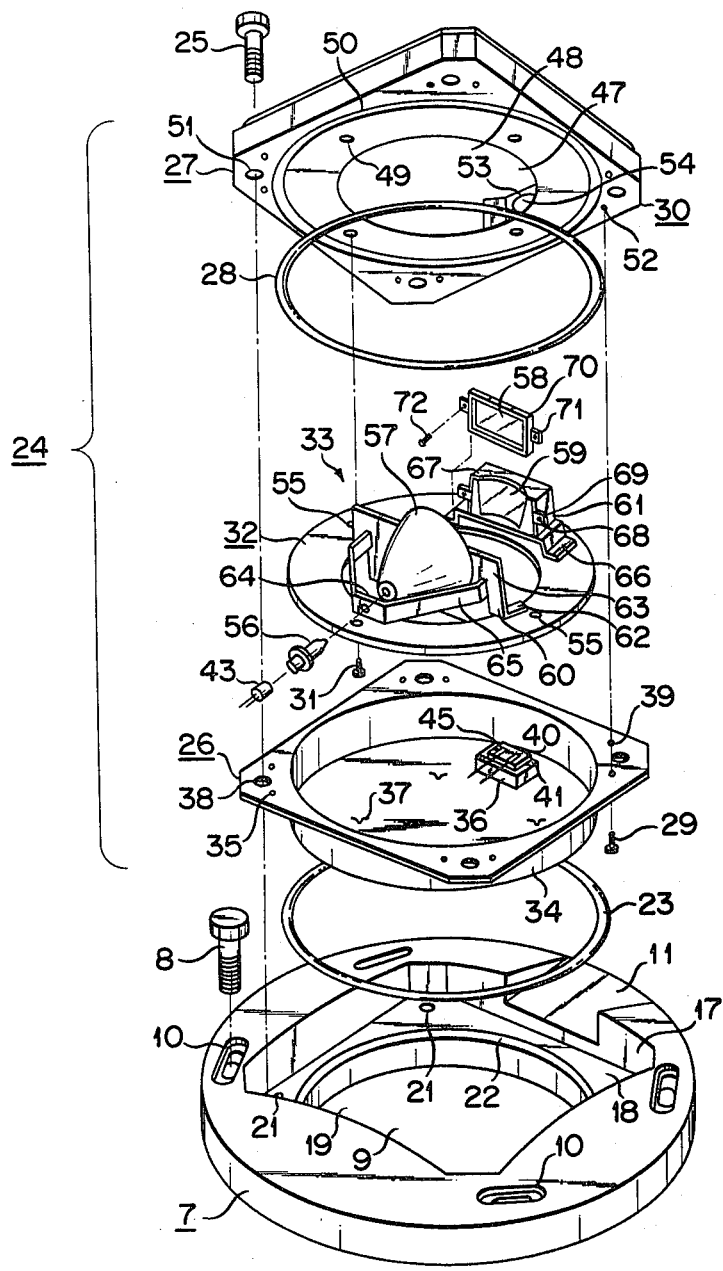
FIG. 2 is an exploded perspective view showing an optical system unit and support member of the marker light.

FIG. 1 shows a sectional view of the marker light in the assembled state, and FIG. 2 is an exploded perspective view of the light. Referring to the Figures, designated at 1 is a metal vessel accommodating a transformer 2. The vessel 1 has a cylindrical form open at one end, and its side wall is formed with a code hole 3. A ring-like support member 5 having four threaded holes 4 is provided on the upper open end of the vessel 1. A ring-like auxiliary member 6 is provided above the vessel 1. A holding member 7 is secured to the support member 5 by four screws 8 screwed in the threaded holes 4 of the support member 5.

The holding member 7 is a casting of iron, aluminum or the like and has a flat disc-like form with the upper surface having a tapered portion near the periphery. The holding member 7 has a central accommodation space 9 and four elongate holes 10 for passing screws 8, around the space 9, which are open both at the top and bottom surfaces. The upper surface of the holding member 7 is formed with a light projection guide groove 11 communcating with the accommodation space 9 and upwardly inclined toward the outer periphery. An annular projection 12 is formed on the bottom surface of the holding member 7 and its lower outer periphery is in contact with the inner periphery of the support member 5. An annular recess 14 is formed in the bottom surface of the annular projection 12, which contacts the corresponding inner and outer edge portions of the upper surface of the support member 5. In the portion of the contact surface 13 between the projection 12 and groove 14 is formed an annular groove 15, in which an O-ring 16 is fitted to seal the gap between the holding member 7 and support member 5. The accommodation space 9 consists of a rectangular upper recess 17 open at the top surface of the holding member 7 and a circular lower hole 19 extending from a bottom support surface 18 of the upper recess 17 and open at the bottom surface. Threaded holes 21 are formed in the support surface 18 near the four corners thereof, and a chamfer 22 is formed at the upper end of the inner periphery of the support surface 18. An optical system unit 24 is mounted on the holding member 7 with an O-ring 23 interposed therebetween, by screws 25 screwed in the threaded holes 21.

The optical system unit 24 comprises an optical system casing 30 including lower and upper casing halves 26 and 27 sealed to each other by an O-ring 28 and assembled by screws 29, a base member 32 disposed within the optical system casing 30 and secured thereto by screws 31 and an optical system 33 attached to the base member 32.

The lower casing half 26 is formed by drawing a metal sheet, and has a cylindrical portion 34 with a bottom wall, fitted in the lower hole 19 in the holding member 7 and an integral flange portion 35 fitted in the rectangular upper recess 17 in the holding member 7. The bottom of the cylindrical portion 34 is formed with an inwardly projecting raised portion 36 having a central hole and a plurality of outwardly projecting portions 37, and the flange portion 35 is formed near its four corners with screw holes 38 and 39 for respectively receiving the screws 25 and 29. An insulating plate 40 is attached by screws 41 on the top of the raised portion 36 and has a lower portion extending downwardly through the central hole and has terminals 45 buried in it for connecting leads 42 from the transformer 2 and leads 44 from a lamp socket 43. The outer space within the raised portion 36 is filled with a heat-resistant resin 46 such as epoxy resin or silicone resin.

The upper casing half 27 is a casting of iron, aluminum or the like having a rectangular form to fit the rectangular upper recess 17 of the holding member 7. The half 27 has a central circular recess 47 formed in the bottom surface to define a sealed circular accommodation space 47 together with the lower casing half 26. Its bottom surface is also formed around the central recess 47 with threaded holes 49 for receiving the screws 31, an annular groove 50 for receiving the O-ring 28, and screw holes 51 near the four corners thereof for receiving the screws 25 and threaded holes 52 for receiving the screws 29. The side wall of the recess 48 is formed with a rectangular light projection window 53 with rounded corners, and a water-proof glass plate 54 of a flat plate is secured to the light projection window 53 by means of an adhesive.

The base member 32 has a ring-like metal plate having an outer diameter slightly smaller than the inner diameter of the cylindrical portion 34 of the lower casing half 26, and is formed with screw holes 55 for receiving the screws 31.

The optical system 33 includes a light source lamp 56 such as a halogen lamp, a reflector 57 having a paraboloidal or ellipsoidal form, a filter 58 and a light control member 59 such as a lens or a prism. The light source lamp 56 and reflector 57 are supported by a first support frame 60 mounted on a rear portion of the base member 32, and the filter 58 and light control member 59 are supported by a second support frame 61 mounted on a front portion of the base member 32.

The first support frame 60 includes a reflector mounting plate 63 with slits extending in a forward direction at its opposite sides and fixed on the base member 32 by screws 62 inserted through the slits such that its position relative to the base member 32 is adjustable. The first support frame 60 includes a central portion supporting the open end of the reflector 57, and an integral lamp mounting plate 65, which has a channel-shaped form with its opposite legs connected to the opposite sides of the back surface of the reflector mounting plate 63 and supports and carries a central lamp holder 64 supporting the light source lamp 56.

Figure 3:
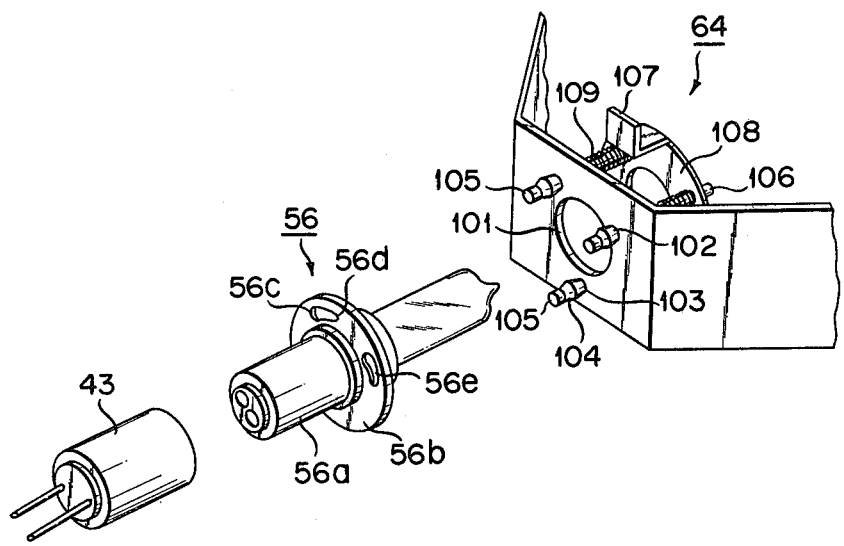
FIG. 3 is an exploded perspective view of a lamp holder.

As most clearly shown in FIG. 3, the lamp holder 64 includes three lock pins 105 inserted in the respective pin holes 102 formed in the lamp mounting plate 65 and the pins 105 have a rear end portion 104 having a tapered portion 103. A ring-like coupling plate 108 couples the forward ends of the three lock pins 105 tied thereto by clamping or with nuts 106. The plate 108 has an operating piece 107, and three coil springs 109 fitted on the respective lock pins 105 between the coupling plate 108 and lamp mounting plate 65. The light source lamp 56 has a base $56_a$ fitted in the lamp socket 43 and a flange $56_b$ provided adjacent to the base $56_a$ and formed with three engagement holes $56_e$ each consisting of a circular hole portion $56_c$ having a diameter slightly greater than the diameter of the rear end portion 104 of the lock pin 105 and an elongate hole portion $56_d$ continuous to the circular hole portion $56_c$ and having a diameter of smaller dimension.

The second support frame 61 has slits extending in a forward direction at its opposite sides and is fixed on the base member 32 by screws 66 inserted through the slits such that its position relative to the base member 32 is adjustable. The frame 61 includes a light control member case 67 accommodating the light control member 59 and ears 69 projecting from the opposite sides of the rear end of the light control member case 67 and formed with respective threaded holes 68. Ears 71 of a filter case 70, in which the filter 58 is mounted, are secured by screws 72 to the ears 69.

The method of assembly and operation of the above construction will now be described.

The vessel 1 is buried at the time of construction work by paving or by digging a hole with a cutter in the case where the vessel 1 is installed after the completion of the pavement work. The holding member 7 is placed on the support member 5 of the vessel 1 in this state and secured thereto by inserting the screws 8 through its elongate holes 10 from above and screwing them into the threaded holes 4 of the support member 5. Since the elongate holes 10 of the holding member 7 have different angles, the holding member 7 can be mounted in correct orientation, and also its orientation can be adjusted by the virtue of the elongate holes 10.

The circular hole portions $56_c$ in the flange $56_b$ of lamp 56 are mounted on the lock pins 105 by gripping the base $56_a$, and then the base $56_a$ is turned such that the lock pin is relatively moved from the circular hole portion $56_c$ toward the elongate hole portion $56_d$. As a result, portions of the flange $56_b$ adjacent to the elongate hole portions $56_d$ are locked by the tapered portions 103 of the lock pins 105 which are forwardly biased by the springs 109. At this time, it may happen that rotation of the light source lamp 56 after insertion thereof in the lamp holder 64 cannot be smoothly made due to the fact that the springs 109 are given a compressive force above a predetermined value for providing a lamp locking force. In such a case, the operating piece 107 is rearwardly moved against the springs 109, whereby the gap between the tapered portion 103 of each lock pin 105 and lamp mounting plate 65 is increased to permit ready installation of the light source lamp 56. The lamp socket 43 is then fitted on the base $56_a$ of the light source lamp 56.

The filter 58 is also mounted by the screws 72 on the ears 71 of the second support frame 61 and in this state the optical system 33 mounted on the base member 32 is adjusted. The center of the filament of the light source lamp 56 is principally set at the focal point of the reflector 57. The interrelation among the light source lamp 56, filter 58 and light control member 59 is adjusted by moving the first and second support frames 60 and 61 against the base member 32.

Subsequently, the base member 32 is secured by the screws 31 to the bottom surface of the upper casing half 27, and then the lower casing half 26 is secured by the screws 29 to the upper casing half 27 with the O-ring 28 fitted in the annular groove 50 in the upper casing half 27 thus completing the optical system unit 24. In the optical system unit 24 in this state, the interior of the optical system casing 30 is perfectly hermetically sealed since the O-ring 28 is provided along the boundary between the upper and lower casing halves 27 and 26.

Then, the O-ring 23 is fitted on the cylindrical portion 34 of the lower casing half 26, and then the optical system unit 24 is inserted into the accommodation space 9 of the holding member 7 and secured thereto by the screws 25. Consequently, the holding member 7 and optical system unit 24 are secured to each other with the O-ring 23 between the chamfer 22 and the outer surface of the lower casing half 26, so that rain water or dust will never enter the interior of the vessel 1.

While the optical system unit 24 has to be removed from the holding member 7 at the time of repair after the installation, even if dust intrudes into the rectangular lower space 17 in the holding member 7 and is collected in the neighborhood of the O-ring 23 at the time when the optical system unit 24 is removed, it can readily cleaned since the surfaces necessary for positioning the optical system unit 24 relative to the holding member 7 are only the taper surface 22 and flat support surface 18. Meanwhile, the optical system unit 24, when it is removed and placed on the road surface, will never accept dust since the optical system casing 30 is hermetically sealed. Besides, when it is placed on the road surface or the like, the leads 42 will not be bent because the terminals 45 do not project, that is, because the bottom of the lower casing half 26 is provided with the projection 37.

Considering now the installed state of the marker light which has been assembled in the above way, while the holding member 7 is slightly moved by a wheel of an airplane or a vehicle in the direction of running thereof since the upper portions of the holding member 7 and optical system unit 24 project from the road surface, the road surface will not be damaged by the outer periphery of the holding member 7 since the projection 12 of the holding member 7 engages with the inner periphery of the support member 5. In addition, although the holding member 7 receives vertical load when an airplane or the like runs over it, the support member 7 has no drawback in terms of mechanical strength since it supports its inner and outer contact surfaces 13 with respect to the support member 5.

Although in the above mentioned embodiment the first and second support frames 60, 61 are removably and shiftably attached to the base member 32, these supports may be integrally formed to the base member.

As has been shown, according to the invention all the optical system component parts are mounted on the base member to constitute an optical unit and then received within the optical system casting, so that the adjustments of these parts regarding the direction of light projection and so forth can be made before they are assembled within the optical system casing, thus permitting very ready adjustment work and also repair and maintenance. In addition, because the optical system components parts are mounted on the base member, the direction of light projection can be desirably altered without altering the optical system casing at all by merely altering relevant optical system component parts. Further, even if the optical system casing is deformed by an airplane or the like running over it, the inside optical system parts will never be damaged.

I claim:

1. A marker light comprising:
   a housing adapted to be embedded in or adjacent a runway, and having a flange on the upper portion formed with a circular series of apertures;
   a mounting frame positioned on the flange with the upper surface exposed from the ground, the mounting frame including a circular series of arcuate slots formed along the outer periphery, an annular recess formed on the inner periphery and a plurality of threaded holes formed in the annular recess;
   said mounting frame having an upper surface which is inclined so as to protrude from the ground, said upper surface having a projection guide groove cut therein, said mounting frame being narrower toward its outer periphery;
   a plurality of fasteners extending through the arcuate slots in said mounting frame and apertures in said flange, and operable to fixedly clamp the mounting frame to the flange so that the position of the mounting frame is adjustable in a horizontal plane;
   a casing including a peripheral portion positioned on the annular recess so that the casing is supported by the mounting frame, the casing including a window for directing a beam radially, said window being formed in alignment with one end of said guide groove in the upper portion of the casing, a plurality of apertures formed in the peripheral end and corresponding to said threaded holes in the annular recess, and a sealed chamber; and a lamp and light control member which are disposed in the sealed chamber whereby light emitted from the lamp is projected from the window through the light control member.

2. A marker light according to claim 1 wherein said flange of the housing has a plurality of screw holes arranged in a circular relationship corresponding to the arcuate holes formed in the mounting frame, and said fasteners are inserted through the arcuate holes from the upper side and are screwed in the apertures formed in the flange.

3. A marker light according to claim 1 or 2 which includes a supporting plate fixed to the casing and housed in the sealed chamber, a first supporting member, a reflector fixed to the supporting plate through the first supporting member, and a second supporting member for fixing the lamp to the supporting plate at a focusing point of the reflector.

4. A marker light according to claim 3 wherein said supporting plate includes a ring shaped plate with an inner periphery surrounding the reflector.

5. A marker light according to claim 4 wherein said lamp, reflector and light control member constitute an optical unit.

6. A marker light according to claim 5 wherein said casing includes an upper portion and a lower portion, said lower portion being formed from a drawn metal plate.

* * * * *